Patented Dec. 30, 1941

2,267,867

UNITED STATES PATENT OFFICE 2,267,867

METHOD OF PREPARING AZO PIGMENTS

Roy Herman Kienle, Bound Brook, N. J., assignor, by mesne assignments, to American Cyanamid Company, New York, N. Y., a corporation of Maine No Drawing. Application November 19, 1938, Serial No. 241,335

10 Claims. (Cl. 106—289)

This invention relates to improved azo pigments and processes of producing them.

In the past, it has been proposed to extend azo pigments by precipitating or forming the azo pigment on substrates. Such a procedure involves chemical reaction of the azo pigment and usually produces by-products of the reaction. Examples of such processes are where two components of an insoluble azo pigment are caused to react with each other in the presence of a substrate.

It has also been proposed to produce extended azo pigments by precipitating an azo pigment by chemical reaction and, at the same time, chemically precipitating a substrate therewith. For example, a mixture of one component of an azo pigment may be mixed with barium chloride and reacted with a mixture of a sulfate and the other component of the azo pigment, thus producing the pigment and the substrate in the same operation. A small advantage in fineness of division thus obtained is counter-balanced to a greater or less extent by the presence of other products of reaction which are produced in intimate admixture with the azo pigment and substrate.

An improvement over the two processes outlined above is described in the copending application of Crossley and Kienle, Serial No. 233,483 filed October 5, 1938, according to which azo pigments are physically dissolved in solvents from which they are then precipitated onto substrates, either colored or uncolored, without substantial chemical change of the azo pigment. Thus, the azo pigment is transformed from solution into an insoluble form without the production of by-products which might contaminate the final extended pigment. Still better results are obtained when the azo pigment is precipitated from a concentrated acid solution, such as concentrated sulfuric acid or chlorsulfonic acid or the like, as described in the copending application of Gerdsen, Serial No. 245,376 filed December 13, 1938. The term "without substantial chemical change" is used to distinguish precipitations from solutions from precipitations where there is a definite new chemical compound formed. It is assumed frequently in physical chemistry that solutions may involve some chemical change and possibly form hydrated compounds while in solution but the chemical bonds thus resulting are relatively loose and are of a different character from those which result when precipitation is effected by a reaction with the material precipitated. Throughout this specification and claims the expression "without substantial chemical change" is used to cover procedures in which no chemical change other than that of ordinary solution and precipitation takes place and it should be understood that the expression is employed in no other sense.

The present invention relates to azo pigments of extremely fine particle size possessing improved brightness over pigments of the prior art, and to processes of preparing these improved pigments which are useful in the coating composition, ink, direct textile printing, rubber, plastic, casting resins, paper, and like fields.

According to the present invention, water-insoluble azo pigments, in their final form, are dissolved in an acid, such as concentrated sulfuric acid, chlorsulfonic acid, etc., at a low temperature, about 10° C. or below, and are then re-precipitated by drowning in water or ice. If it is desired to incorporate substrates, they may be either dissolved or suspended in the acid solution of the azo pigment or suspended in the water prior to drowning. These substrates may be colorless, such as barium sulfate, silicic acid, etc., or colored, such as any pigments which are not unduly attacked by the acid in which the azo pigment is dissolved.

A great advantage of the present invention is that it provides an excellent process for the purification of azo pigments. By this method, strong, bright azo pigments in a pure state may be prepared cheaply because of the low cost of the acid used as a solvent and the fact that water or ice is used to throw down the precipitated azo pigment.

Since a low temperature is maintained throughout the process, for example, by the addition of ice to the reaction mixture or by efficient refrigeration, local over-heating is avoided. This is another advantage of the present invention as over-heating is apt to decompose some of the pigment which sometimes affects the shade and fastness. Furthermore, when azo pigments are dissolved in cold concentrated acid according to the present invention, higher yields of improved pigments are obtained than when warm acid is used.

The principal feature of this invention is the method herein described for preparing improved azo pigments, but it should be understood that the invention is intended to include both the new pigments as such and the new pigments precipitated with or on substrates.

The invention will be described in greater detail in conjunction with the following specific examples. The parts are by weight.

Example 1

15 parts of a yellow pigment prepared by diazotizing o-nitro-p-chloraniline and coupling with acetoacet-o-chloranilide are dissolved in 185 parts of 94% sulfuric acid at −3° C., 10 minutes being taken to effect solution. 135 parts of precipitated barium sulfate in 200 parts of 94% sulfuric acid at −3° C. are added to the acid solution of color and the entire slurry stirred for 10 minutes. The mixture so prepared is poured into a mixture of 3000 parts of ice and 8000 parts of water with vigorous agitation. The precipitated color is washed free of acid, then filtered and finally dried at 65° C. A bright, lightfast, homogeneous pigment results which possesses excellent strength and which is easily dispersible in organic coating compositions.

Example 2

15 parts of a yellow pigment prepared by diazotizing m-nitro-p-toluidine and coupling on acetoacetanilide are dissolved in 144 parts of concentrated sulfuric acid, the temperature being maintained at about 0° C. by the addition of crushed solid carbon dioxide as necessary. Without allowing the temperature to rise, an additional 144 parts of concentrated sulfuric acid are added, followed by 90 parts of precipitated barium sulfate. The resulting slurry is stirred for 5–10 minutes and then added rapidly with stirring to 4000 parts of water and 4000 parts of ice. A homogeneous yellow precipitate is formed which is allowed to settle and is then washed free from acid by repeated reslurrying and decantation with water. The final pigment is filter-pressed and dried at 65°–70° C. A bright strong yellow pigment suitable for pigmenting coating compositions, plastics, etc., results.

The barium sulfate may be replaced by other substrates, for example, clay, silica, or anthraquinone.

Example 3

3 parts of a blue pigment made by tetrazotizing dianisidine and coupling on the benzamide of beta hydroxynaphthoic acid and 12 parts of a yellow pigment which was made by diazotizing 3-chlor-5-methoxyaniline and coupling on acetoacet-p-phenetidide are dissolved in 300 parts of 94% sulfuric acid at 0° C. 35 parts of precipitated barium sulfate are added as soon as the color is in solution and stirred in the acid solution for 20 minutes. The mixture so obtained is then poured into 2000 parts of ice and 1000 parts of water. The precipitated green color is washed free of acid by decantation, filtered and finally dried at 60° C. in an air drier.

Example 4

20 parts of an orange azo pigment which is prepared by diazotizing m-chloraniline and coupling on the o-toluidide of beta oxynaphthoic acid are dissolved in 600 parts of 94% sulfuric acid at 0° C. to 5° C. The clear solution of the color in acid is poured into 2000 parts of water and 1500 parts of ice. The color is precipitated as a flocculent, finely divided orange pigment which is washed acid free, then filter-pressed. The press cake is composed of fine particles and can either be dried and then used as a pigment per se or flushed with oils or lacquer bases to yield an orange flushed color.

What I claim is:

1. A water insoluble azo pigment prepared by dissolving an azo pigment in concentrated acid included in the group consisting of sulfuric acid and chlorsulfonic acid at a temperature below 10° C. and precipitating it therefrom also at a temperature below 10° C. without substantial chemical change during the precipitation by the addition to the solution of an aqueous liquid miscible with the acid but having no substantial solvent powers on the pigment.

2. A water insoluble azo pigment composition prepared by dissolving an azo pigment in concentrated acid included in the group consisting of sulfuric acid and chlorsulfonic acid at a temperature below 10° C. and precipitating it therefrom also at a temperature below 10° C. onto a substrate without substantial chemical change during the precipitation by the addition to the solution of an aqueous liquid miscible with the acid but having no substantial solvent powers on the pigment.

3. A water insoluble azo pigment prepared by dissolving an azo pigment in concentrated sulfuric acid at a temperature below 10° C. and precipitating it therefrom also at a temperature below 10° C. without substantial chemical change during the precipitation by the addition to the solution of an aqueous liquid miscible with the acid but having no substantial solvent powers on the pigment.

4. A water insoluble azo pigment composition prepared by dissolving an azo pigment in concentrated sulfuric acid at a temperature below 10° C. and precipitating it therefrom also at a temperature below 10° C. onto a substrate without substantial chemical change during the precipitation by the addition to the solution of an aqueous liquid miscible with the acid but having no substantial solvent powers on the pigment.

5. A method of preparing a water insoluble azo pigment which comprises dissolving the azo pigment in concentrated acid included in the group consisting of sulfuric acid and chlorsulfonic acid at a temperature below 10° C. and precipitating it therefrom also at a temperature below 10° C., the precipitation being effected without substantial chemical change of the pigment by the addition to the solution of an aqueous liquid miscible with the acid but having no substantial solvent powers on the pigment.

6. A method of preparing a water insoluble azo pigment composition which comprises dissolving an azo pigment in concentrated acid included in the group consisting of sulfuric acid and chlorsulfonic acid at a temperature below 10° C. and precipitating it therefrom also at a temperature below 10° C. onto a substrate, the precipitation being effected without substantial chemical change of the pigment by the addition to the solution of an aqueous liquid miscible with the acid but having no substantial solvent powers on the pigment.

7. A method of preparing a water insoluble azo pigment which comprises dissolving the azo pigment in concentrated sulfuric acid at a temperature below 10° C. and precipitating it therefrom also at a temperature below 10° C., the precipitation being effected without substantial chemical change of the pigment by the addition to the solution of an aqueous liquid miscible with the acid but having no substantial solvent powers on the pigment.

8. A method of preparing a water insoluble azo pigment composition which comprises dissolving an azo pigment in concentrated sulfuric acid at a temperature below 10° C. and precipitating it therefrom also at a temperature below 10° C. onto a substrate, the precipitation being effected without substantial chemical change of the pigment by the addition to the solution of an aqueous liquid miscible with the acid but having no substantial solvent powers on the pigment.

9. A method according to claim 5 in which the precipitation is effected by drowning with water.

10. A method according to claim 7 in which the precipitation is effected by drowning with water.

ROY HERMAN KIENLE.